Patented May 6, 1952

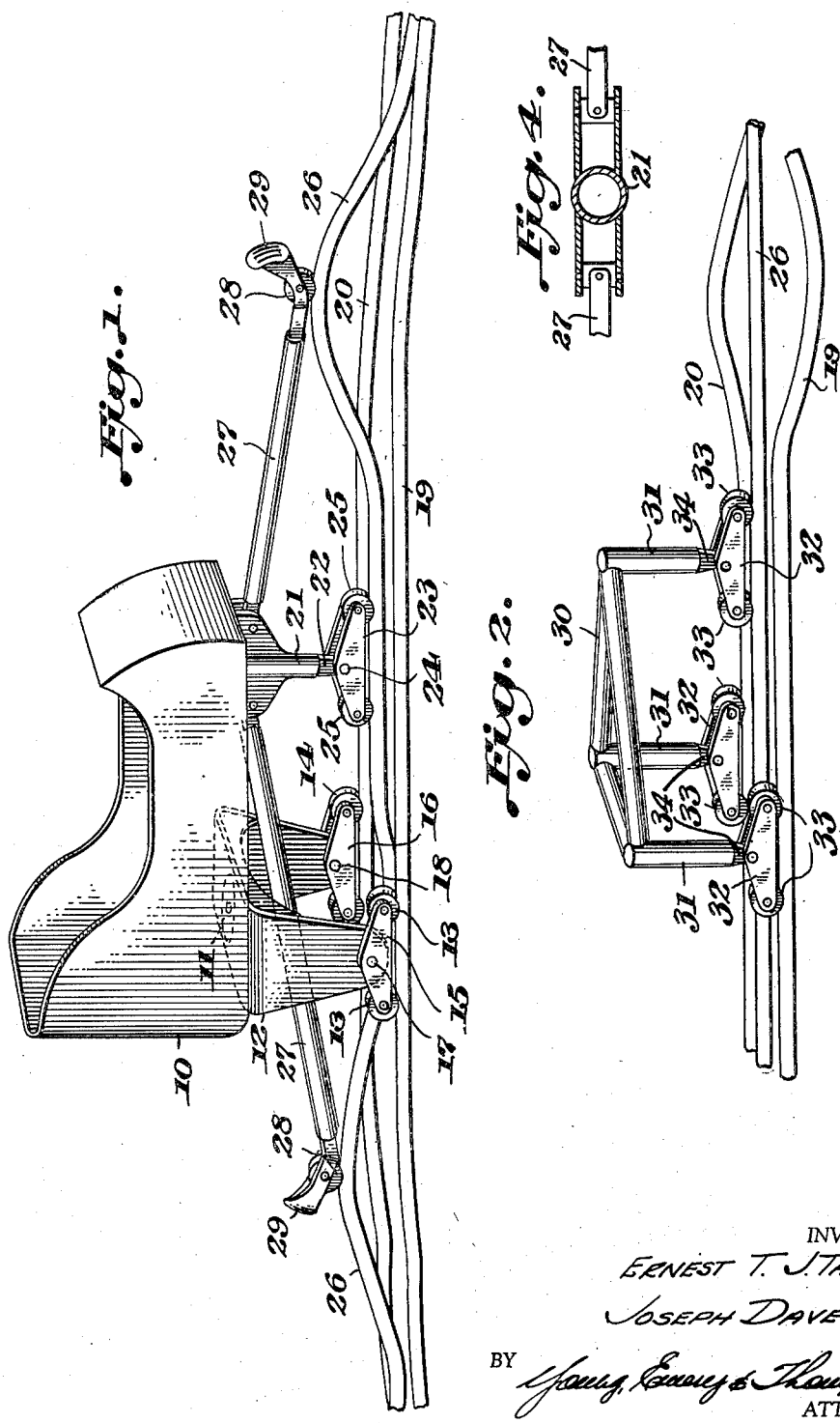

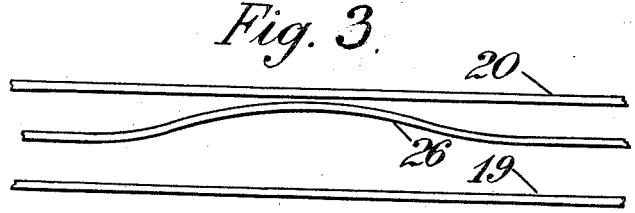
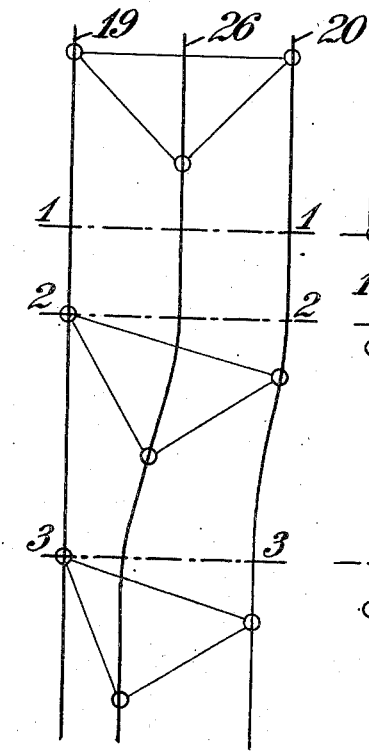
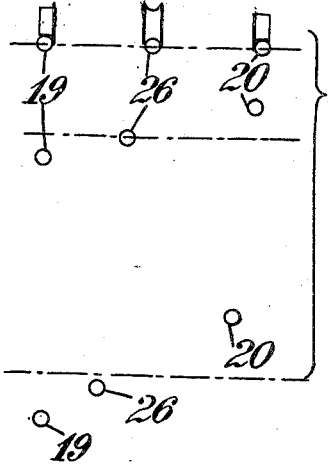

2,595,992

UNITED STATES PATENT OFFICE 2,595,992

AMUSEMENT TRACK APPARATUS

Ernest Thomas James Tapp, and Joseph Davey, Fleet, England, assignors to County Commercial Cars Limited, Fleet, England, a British company Application August 26, 1947, Serial No. 770,662
In Great Britain August 8, 1946

Section 1, Public Law 690, August 8, 1946.
Patent expires August 8, 1966

9 Claims. (Cl. 104—63)

1

This invention relates to amusement track apparatus of the kind in which a passenger carrier supported on wheels is traversed along a track and at the same time has imparted to it an additional movement to the traversing movement under the control of said track.

According to this invention, an amusement track apparatus of the kind referred to above is characterised in that the passenger carrier is supported on track wheels so as to be capable of rotational movement relatively to said wheels about an upright axis and in that said track is arranged to control means for effecting said rotational movement.

The passenger carrier may also be so mounted as to be capable of swinging movement about an axis transverse to said upright axis, which movement is also controlled by said track.

In one construction according to this invention, a passenger carrier is mounted on a turntable supported by a bogie truck so that the passenger carrier may rotate relatively to the bogie truck about a vertical axis and the bogie truck is so supported by wheels as to be capable of tilting bodily about an axis transverse to the upright axis, and which passenger carrier is also arranged to engage a track which is provided with both up and down and lateral inflexions.

Preferably the wheels of the aforesaid bogie truck are arranged to be guided along a track different from that providing the up and down lateral deflections.

The aforesaid bogie truck carrying the turntable may be supported on two pairs of wheels, the wheels in each pair being arranged one behind the other and the two pairs being guided respectively by two parallel track rails and each pair of wheels is mounted on the body of the trolley so as to be capable of bodily rocking movement about the aforesaid transverse axis, while the passenger carrier is provided with one or more other wheels which engage an additional track trail in advance of and/or to the rear of the first said pairs of wheels. For example, the passenger carrier may be provided with a pair of wheels arranged one behind the other in advance of said bogie truck, which pair of wheels is so mounted on the carrier as to permit relative rotation about an upright axis.

In the above arrangement, the up and down inflexions in the additional track will cause both the bogie truck and the passenger carrier to rock relatively to the two pairs of trolley wheels about said transverse axis, while the lateral inflexions will cause the passenger carrier to rotate on said turntable about said vertical axis. If desired, the levels of the other two rails may be arranged to vary in relation to one another along their length.

In an alternative arrangement, the aforesaid passenger carrier is mounted on three wheels or sets of wheels triangularly arranged and engaging respectively three track rails and each capable of bodily rotation relatively to the passenger carrier about a vertical axis, which track rails are provided with lateral inflexions so that the passenger carrier may be given, in addition to a bodily translator movement along the rails, a rotational movement about an upright axis.

Preferably at least one of said rails is also provided with up and down inflexions. In such an arrangement, when each set of supporting wheels comprises more than one wheel arranged one in front of another, each said set is so mounted on the passenger carrier that provision is made for relative rocking movement about an axis transverse to said vertical axis in addition to the rotation about the vertical axis.

In either of the arrangements referred to above where more than one passenger carrier are arranged independently on said tracks, collision between the body parts of the carriers is prevented by collision-fenders projecting fore-and-aft of the carriers, each provided with a wheel arranged to engage a track rail and each fender attached to the body part or to a trolley so as to be capable of rocking movement about two axes at right-angles, so that in the event of collision the fenders engage one another.

The following is a description of two alternative forms of the invention, reference being made to the accompanying drawing, in which:

Figure 1 is a diagrammatic perspective view of a passenger carrier supported by three sets of wheels on three rails, two of which sets are mounted on a bogie; and Figure 2 is a similar view to Figure 1, in which all three sets of wheels are mounted directly on the frame of the passenger carrier.

Figure 3 is a plan view of a section of track showing the deviation of the center rail relative to the outside rails.

Fig. 4 is a fragmentary detailed bottom view of the front bearing member of the vehicle shown in Fig. 1, illustrating the connection between the collision poles and the bearing member.

Fig. 5 is a plan view of a section of track for the carrier of Fig. 2;

Fig. 6 is a series of diagrammatic sectional views taken on lines 1—1, 2—2, and 3—3 of Fig. 5 showing the relative disposition of the rails.

Referring to Figure 1, the body 10 of the passenger carrier is mounted on a turntable 11 provided between it and a bogie 12. The bogie truck is provided with two pairs of wheels 13 and 14 which are carried by yokes 15 and 16 pivoted at 17 and 18 to the trolley to swing about transverse axes. The two pairs of wheels are arranged to engage equi-distant track rails 19 and 20. The front of the passenger carrier is provided with an upright bearing member 21 in which is rotatably mounted a shaft 22. A yoke piece 23 supporting a pair of wheels 25 is pivotally secured at 24 to the lower end of the shaft so as to swing about a transverse axis.

The wheels 25 engage a third rail 26 which may have both up-and-down and sideways deflections, thus causing the bogie truck and body to tilt about the transverse axes and to rotate on said turntable. Collision poles 27 are pivoted to the bearing member 21 and extend fore-and-aft of the body and are provided with wheels 28 which engage the rail 26 and are also provided with bumpers 29.

In the arrangement shown in Figure 2, a triangular frame 30 for carrying a passenger carrier is provided with three tubular legs 31, in each of which is rotatably mounted an upright shaft 34. The lower end of each shaft is provided with a yoke piece 32 carrying a pair of wheels 33.

The three pairs of wheels engage three rails respectively so that when there is lateral deviation of the center rail with respect to the outer rails, the frame is caused to turn about an upright axis. In this instance, the distance between the two outer rails will vary to correspond to the effective distance (transversely of the rails) between the two wheels engaging the outer rails as shown in Figures 5 and 6 so as to maintain the wheel units on the rails in all positions of the carrier.

We claim:

1. An amusement track apparatus comprising two outer track rails, an intermediate track rail extending along with the outer rails and having its location with respect to the two outer rails varying along the length of the rails, a passenger carrier, a supporting flanged wheel unit on one side of the carrier and mounted on one of the outer rails, a supporting flanged wheel unit on the other side of the carrier and mounted on the other outer rail and a third supporting flanged wheel unit between the aforesaid wheel units but spaced longitudinally of the carrier from said wheel units and mounted on the intermediate rail, and means for pivotally mounting the wheel units on the carrier for pivotal movement about vertical axes.

2. An amusement track apparatus comprising two outer track rails, an intermediate track rail extending along with the outer rails and having its location with respect to the two outer rails varying horizontally and vertically along the length of the rails, a passenger carrier, a supporting flanged wheel unit on one side of the carrier and mounted on one of the outer rails, a supporting flanged wheel unit on the other side of the carrier and mounted on the other outer rail and a third supporting flanged wheel unit between the aforesaid wheel units but spaced longitudinally of the carrier from said wheel units and mounted on the intermediate rail, and means for pivotally mounting the wheel units on the carrier for pivotal movement about vertical axes.

3. An amusement track apparatus comprising two outer track rails, an intermediate track rail extending along with the outer rails and having its location with respect to the two outer rails varying at least laterally along the length of the rails, a bogie truck, a supporting flanged wheel unit on one side of the bogie truck and mounted on one of the outer rails, a supporting flanged wheel unit on the other side of the bogie truck and mounted on the other outer rail, a passenger carrier, means pivotally mounting the carrier on the bogie truck for pivotal movement relative to the bogie truck about a first vertical axis, a third supporting flanged wheel unit mounted on the intermediate rail, and means for pivotally mounting the carrier on the third supporting flanged wheel unit for relative pivotal movement about a second vertical axis spaced longitudinally of the carrier from said first vertical pivotal axis.

4. An amusement track apparatus comprising two outer track rails, an intermediate track rail extending along with the outer rails and having its location with respect to the two outer rails varying at least laterally along the length of the rails, a passenger carrier, a supporting flanged wheel unit on one side of the carrier and mounted on one of the outer rails, a supporting flanged wheel unit on the other side of the carrier and mounted on the other outer rail and a third supporting flanged wheel unit between the aforesaid wheel units but spaced longitudinally of the carrier from said wheel units and mounted on the intermediate rail, and means for pivotally mounting the wheel units on the carrier for pivotal movement about vertical axes, the two outer rails varying as a function of the variation of the intermediate rail at least laterally with respect to each other along the lengths to maintain the wheel units on the rails in all positions of the carrier.

5. An amusement track apparatus comprising two outer track rails, an intermediate track rail extending along with the outer rails and having its location with respect to the two outer rails varying at least laterally along the length of the rails, a bogie truck, a pair of flanged wheels on one side of the bogie truck and mounted on one of the outer rails with one wheel in advance of the other, a pair of flanged wheels on the other side of the bogie truck and mounted on the other outer rail with one wheel in advance of the other, a yoke on each side of the truck interconnecting the two wheels of each pair, means pivotally mounting the yokes on the bogie truck for relative pivotal movement about an axis extending transversely across the rails, a passenger carrier, means pivotally mounting the carrier on the bogie truck for pivotal movement relative to the bogie truck about a first vertical axis, a third pair of wheels flanged on both sides and mounted on the intermediate rail with one wheel in advance of the other, a yoke interconnecting the third pair of wheels, and means for pivotally mounting the carrier on the yoke of the third pair of wheels for relative pivotal movement about a second vertical axis spaced longitudinally of the carrier from said first vertical axis, and for relative pivotal movement about an axis extending across the track transversely of the second vertical axis.

6. An amusement track apparatus comprising two outer track rails, an intermediate track rail extending along with the outer rails and having its location with respect to the two outer rails varying along the length of the rails, a passenger carrier, a supporting flanged wheel unit on one side of the carrier and mounted on one of the outer rails, a supporting flanged wheel unit on the other side of the carrier and mounted on the other outer rail and a third supporting flanged wheel unit between the aforesaid wheel units but spaced longitudinally of the carrier from said wheel units and mounted on the intermediate rail, means for pivotally mounting the wheel units on the carrier for pivotal movement about vertical axes, collision fenders projecting fore and aft of the carrier, each including a wheel mounted on one of the rails, and means for connecting each fender to the carrier for pivotal movement about a vertical axis and an axis extending transversely thereto.

7. An amusement track apparatus comprising two outer track rails, an intermediate track rail extending along with the outer rails and having its location with respect to the two outer rails varying at least laterally along the length of the rails, a passenger carrier, three supporting flanged wheel units disposed apart in a triangular manner with one unit mounted on one outer rail, another unit mounted on the other outer rail and the third unit mounted on the intermediate rail, and means for pivotally mounting the units on the carrier for relative pivotal movement about spaced vertical axes, the wheel unit mounted on the intermediate rail having flanges engaging both sides of the intermediate rail.

8. An amusement track apparatus comprising two outer track rails, an intermediate track rail extending along with the outer rails and having its location with respect to the two outer rails varying at least laterally along the length of the rails, a passenger carrier, three supporting flanged wheel units disposed apart in a triangular manner with one unit mounted on one outer rail, another unit mounted on the other outer rail and the third unit mounted on the intermediate rail, and means for pivotally mounting the units on the carrier for relative pivotal movement about spaced vertical axes and about horizontal axes perpendicular to the vertical axes and extending perpendicularly to the rails at each wheel unit location, the two outer rails varying at least laterally with respect to each other along the length of the rails to maintain the wheel units on the rails in all positions of the carrier.

9. An amusement track apparatus comprising two outer track rails, an intermediate track rail extending along with the outer rails and having its location with respect to the two outer rails varying at least laterally along the length of the rails, a passenger carrier, three supporting flanged wheel units disposed apart in a triangular manner with one unit mounted on one outer rail, another unit mounted on the other outer rail and the third unit mounted on the intermediate rail, means for pivotally mounting the units on the carrier for relative pivotal movement about spaced vertical axes, the wheel unit mounted on the intermediate rail having flanges engaging both sides of the intermediate rail, collision fenders projecting fore and aft of the carrier, each including a wheel mounted on one of the rails, and means for connecting each fender to the carrier for pivotal movement about a vertical axis and an axis extending transversely thereto.

ERNEST THOMAS JAMES TAPP.
JOSEPH DAVEY.

REFERENCES CITED

The following references are of record in the file of this patent:

UNITED STATES PATENTS

| Number | Name | Date |
| --- | --- | --- |
| Re. 18,544 | Cassidy et al. | July 26, 1932 |
| 834,016 | May | Oct. 23, 1906 |
| 1,152,290 | Carruthers | Aug. 31, 1915 |
| 1,762,507 | Custer | June 10, 1930 |
| 1,890,137 | Traver | Dec. 6, 1932 |
| 2,039,473 | Bennington | May 5, 1936 |
| 2,196,093 | Bartlett | Apr. 2, 1940 |

FOREIGN PATENTS

| Number | Country | Date |
| --- | --- | --- |
| 591,499 | France | July 4, 1925 |